UNITED STATES PATENT OFFICE.

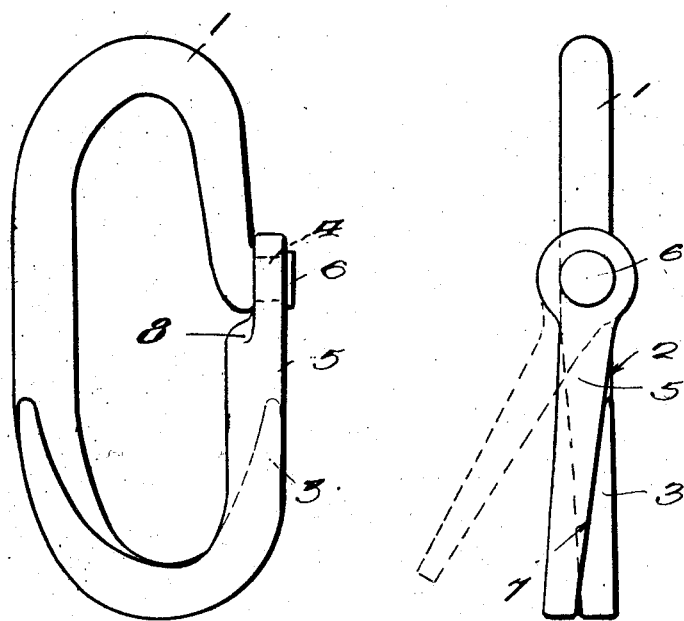

ALLEN D. KELLY, OF IRONTON, OHIO.

OPEN LINK.

1,335,377.  Specification of Letters Patent.  Patented Mar. 30, 1920.

Application filed April 10, 1918. Serial No. 227,662.

*To all whom it may concern:*

Be it known that I, ALLEN D. KELLY, a citizen of the United States, residing at Ironton, in the county of Lawrence and State of Ohio, have invented certain new and useful Improvements in Open Links, of which the following is a specification.

This invention relates to improvements in chain links and it is the principal object of the invention to provide a novel detachable or open link, the construction of which is such as to permit the quick removal of the same for repair from a chain composed thereof or for various other purposes.

The improvements in the details and arrangement of parts will be apparent from an inspection of the accompanying drawing, in connection with the specific description hereinafter contained, and wherein the preferred embodiment of the invention is disclosed for imparting a full understanding thereof.

In the drawings:

Figure 1 is a side elevation of the improved link, and

Fig. 2 is an end view thereof.

Having more particular reference to the drawings, in connection with which like reference characters will designate corresponding parts throughout the views, 1 represents the oval shaped body of the link, one side of which is partly open as indicated by the numeral 2 and has a portion of the same flattened and tapered as at 3. One of the ends of the link body 1 is provided with a right angularly disposed lug 4 whereby the apertured end of a curved arm 5 may be engaged thereover; said lug being then swaged or upset as at 6 forming a head to prevent displacement of the arm. In this connection, it is to be noted that the arm 5 is curved upon itself and formed complemental to the adjacent curved portion of the link body and also that the same is flattened and tapered as indicated by the numeral 7, thus allowing it to conform to the general shape or outline of the link body when arranged in closed position over the opening 2. It is to be noted that when the apertured end of the arm 5 is formed, as by flattening, that a stop shoulder 8 is provided and this shoulder is designed to abut that portion of the link body which carries the lug 4, for limiting swinging movement of the arm 5, thereby preventing a complete swinging of the said arm and insuring of a proper operation of the link, at all times.

When using my improved detachable or open link, the pivoted arm 5 is swung to a position as shown in dotted lines in the Fig. 2 whereupon the same will be engaged with a second link. At this time, the arm 5 is swung to its closed position, that is, adjacent the tapered portion 3 of the link body 1 and when in this position will serve as an effectual and positive lock and prevent undue disengagement of the same from the link or chain to which it is attached until desired.

From the foregoing, it will be readily understood by persons skilled in the art that I have provided an exceedingly simple and practical form of detachable or open link, the construction of which will eliminate the necessity of bending or forcing the adjacent ends of a link from each other in order to remove the same from a chain or link engaged thereby. Further, by reason of the arrangement and the construction of the arm 5, an effectual and positive lock will be afforded and will serve to render the chain composed of these links exceedingly secure and strong.

Manifestly, the construction shown is capable of considerable modification and such modification as is within the scope of my claim, I consider within the spirit of my invention.

I claim:

An open link, comprising an oval-shaped open link made up of a single length of material curved at one end forming a loop terminating in an offset pivot lug projecting in the plane of said loop and in front of the terminal portion of the latter, the other or opposite end terminating in a hook-shaped flattened tapered portion spaced from said off-set pivot lug in the plane of said loop and terminal off-set pivot lug, and a transversely swinging closure hook member having an off-set eye pivoted on said off-set pivot lug and forming a shoulder on said terminal portion of said loop to limit the movement of said closure hook member when swung laterally to open position, said closure hook member having a complementary reversely extending flattened and tapered portion to rest against the side of and register and coöperate with said similarly shaped hooked portion of said open link when the latter is closed by said closure hook member.

In testimony whereof I affix my signature hereto.

ALLEN D. KELLY.